(12) United States Patent
Vila Caral

(10) Patent No.: US 7,846,537 B2
(45) Date of Patent: Dec. 7, 2010

(54) LAMINAR SUPPORT FOR ABSORPTION OF COLLISION IMPACTS SUSTAINED BY HUMANS

(75) Inventor: Miguel Vila Caral, Sabadell (ES)

(73) Assignee: Loncar, S.L., Sabadell (Barcelona) (ES)

( * ) Notice: Subject to any disclaimer, the term of this patent is extended or adjusted under 35 U.S.C. 154(b) by 559 days.

(21) Appl. No.: 11/816,199

(22) PCT Filed: Jul. 7, 2006

(86) PCT No.: PCT/ES2006/000391

§ 371 (c)(1),
(2), (4) Date: Aug. 14, 2007

(87) PCT Pub. No.: WO2007/036583

PCT Pub. Date: Apr. 5, 2007

(65) Prior Publication Data

US 2008/0006482 A1    Jan. 10, 2008

(30) Foreign Application Priority Data

Sep. 28, 2005    (ES) ................................. 200502344

(51) Int. Cl.
*E01F 15/06* (2006.01)
*F16F 7/12* (2006.01)

(52) U.S. Cl. .................... 428/192; 428/44; 428/131; 428/195.1; 428/908.8; 428/909; 256/13.1

(58) Field of Classification Search ............... None
See application file for complete search history.

(56) References Cited

U.S. PATENT DOCUMENTS

| 2,465,936 | A | * | 3/1949 | Schultz | 244/110 R |
| 3,892,425 | A | * | 7/1975 | Sakairi et al. | 280/743.1 |
| 3,952,134 | A | * | 4/1976 | Watson | 428/391 |
| 3,983,962 | A | * | 10/1976 | Torke | 188/377 |
| 4,047,702 | A | * | 9/1977 | Cernia et al. | 256/13.1 |
| 4,295,637 | A | | 10/1981 | Hulek et al. | |
| 4,681,302 | A | * | 7/1987 | Thompson | 256/13.1 |

(Continued)

FOREIGN PATENT DOCUMENTS

DE    4009611    10/1991

(Continued)

OTHER PUBLICATIONS

DeFosse, Steve, MAT E 315 Materials Processing I: Laboratory #2: Degradiation of PVC, 1989 (month unknown), Plastics Technology Center at Lexmark, Inc.*

(Continued)

*Primary Examiner*—David R Sample
*Assistant Examiner*—Jeff A Vonch
(74) *Attorney, Agent, or Firm*—Maier & Maier, PLLC

(57) ABSTRACT

The support is of the laminar type and has transversely various areas with different resistance, resilience and coefficient of friction, in order to determine, in the impact of a body on the support, a concave shape in the central part of the support, which is to brake the movement during impact by the body, over the upper or lower edges of the support, and which simultaneously has some heat-resistant friction characteristics, whilst retaining characteristics of sliding without adherence between 100° C. and 200° C.

17 Claims, 1 Drawing Sheet

U.S. PATENT DOCUMENTS

Figure 1:
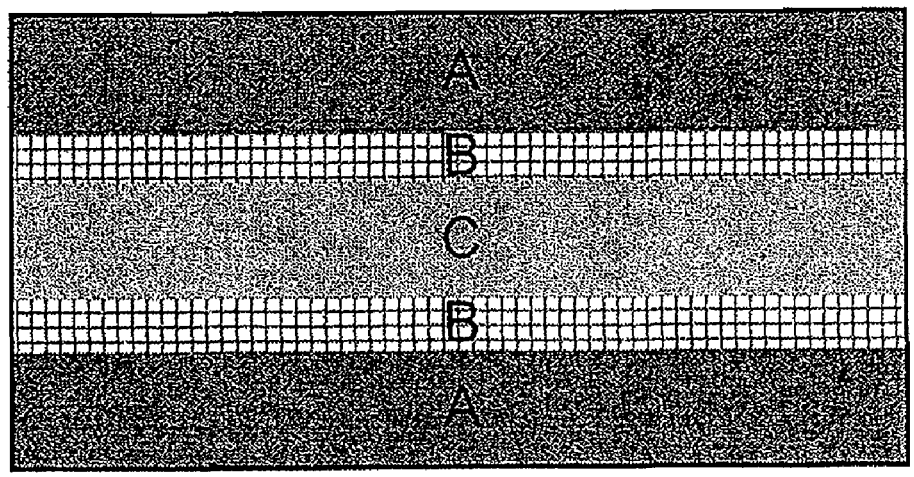

| | | | | |
|---|---|---|---|---|
| 4,982,931 | A | * | 1/1991 | Pomero ..................... 256/13.1 |
| 5,637,114 | A | * | 6/1997 | Hohnke ......................... 8/137 |
| 5,770,313 | A | | 6/1998 | Furumoto et al. |
| 5,788,907 | A | * | 8/1998 | Brown et al. ................. 264/280 |
| 6,000,442 | A | * | 12/1999 | Busgen ....................... 139/389 |
| 6,276,667 | B1 | * | 8/2001 | Arthur ....................... 256/13.1 |
| 6,306,483 | B1 | * | 10/2001 | Bessey et al. ............... 428/175 |
| 7,257,875 | B2 | * | 8/2007 | Masinelli et al. ............... 29/449 |
| 7,575,391 | B2 | * | 8/2009 | Tarazona de La Asuncion 404/6 |
| 2002/0122908 | A1 | | 9/2002 | Li et al. |
| 2002/0167153 | A1 | * | 11/2002 | Kippschull ............... 280/730.2 |
| 2003/0060103 | A1 | * | 3/2003 | Nagaoka et al. ............... 442/59 |
| 2003/0092335 | A1 | * | 5/2003 | Takaoka ......................... 442/1 |
| 2003/0104741 | A1 | * | 6/2003 | Kelmartin et al. ........... 442/164 |
| 2003/0155750 | A1 | * | 8/2003 | Hu et al. .................. 280/730.1 |
| 2006/0083588 | A1 | * | 4/2006 | Masinelli et al. ............... 404/9 |
| 2009/0308238 | A1 | * | 12/2009 | Schwartz ................... 89/36.02 |

FOREIGN PATENT DOCUMENTS

| | | | |
|---|---|---|---|
| GB | 2314802 | * | 1/1998 |
| JP | 2001288640 A | * | 10/2001 |
| WO | WO 2006018458 A1 | * | 2/2006 |

OTHER PUBLICATIONS

Tivar, www.EJBCO.com.*

* cited by examiner

LAMINAR SUPPORT FOR ABSORPTION OF COLLISION IMPACTS SUSTAINED BY HUMANS

CROSS-REFERENCE TO RELATED APPLICATIONS

This application is a 371 National Phase of International Application No. PCT/ES2006/000391, filed Jul. 7, 2006, which claims priority under 35 U.S.C. §119 to Spanish Application No. 200502344 filed Sep. 28, 2005, both of which are hereby incorporated by reference in their entireties.

The present invention is to provide a laminar support for absorption of collision impacts, in particular those produced by the human body in certain circumstances.

The laminar support for absorption of impacts which is the subject of the present invention is to be used in safety systems which are used in activities in which a violent impact of the human body against an obstacle may occur. Amongst these, reference can be made to systems for protection against impacts for motorcyclists, cyclists, skaters, skiers and the like, in activities involved in everyday life, such as using transport, and whilst practising sport, and the like.

As is known, in the aforementioned activities and other similar ones, the human body can move at high speed, such that, in the event of a fall, a strong impact may occur against obstacles which are situated close to the trajectory followed by the user of the aforementioned transport devices, or by people who practise sports.

A case which is particularly well known is that of motorcyclists, since motorcycles are vehicles which are being used ever more extensively. If a fall occurs when travelling on a public road, particularly on highways and motorways, and especially on the parts of these routes which are protected by so-called guard rails, the consequences of the collision caused by the fall can be aggravated greatly by the impact against the support feet of such guard rails.

In order to attempt to solve this problem, numerous devices have been conceived which are based substantially on protection by means of spongy or resilient masses of one structure or another of the posts which secure these guard rails to the ground, or the guard rails themselves, so that the impact can be partially mitigated. However, the kinetic energy which is accumulated in the human body after a fall even at a moderate speed is very high, and is only partly absorbed by the aforementioned protection devices of the resilient type, with the result that in many cases it is not possible to avoid the occurrence of serious or even fatal injuries in the event of impact.

The same applies in the case of cyclists, sports skaters, skiers, etc.

Another known means comprises laminar mesh or strips, such as in the case of skiing competitions, wherein, in the case of impact, in many cases the body can be expelled over the top of these means, because of uncontrolled deformation of the laminar support, or because the installation system of the latter is inadequate. Also, in cases in which a system could be installed on highways, the helmet of the cyclist or motor cyclist generates a friction temperature at the moment of impact, which may soften the material of the component or part of the system formed by the laminar strip, thus giving rise to sudden braking of the head with very high rotational torque, and therefore causing irreparable damage which is aggravated if the impact occurs close to the post or support which belongs to the system in question.

In order to solve the above-described problems, the inventor carried out many tests on tension, elongation and friction at high pressure, until ideal values were obtained for the average energy which is calculated in the impact of, for example, a human body at 60 km/h.

In particular, the objective of the inventor has been to obtain a means for absorbing the kinetic energy of the human body in the case of impact against a guard rail, posts for securing of shock-absorption meshes and other similar items, by combining the absorption of the energy of the body projected against the obstacle with action of local retention, slipping and delayed expulsion of the human body after the collision, consequently preventing the body from striking the guard rails or their securing posts.

In order to obtain the aforementioned results, the present invention is based on the constitution of a shock-absorption support of a laminar type which can be applied in order to improve substantially the effectiveness of any of the existing safety systems to protect against impacts or those which may be developed in the future, this support having a complex structure in the transverse direction, which is characterized in that it has areas on the upper edge and on the lower edge of the laminar body which have greater resistance than those in the intermediate and central areas, and which at the same time have a surface covering which has a controlled coefficient of friction which remains virtually unaltered up to temperatures higher than those which, as has been observed experimentally, can be reached in the event of impact of a human body, for example someone who is wearing a helmet, for a very short period of time during which a very strong force is exerted on the laminar support, and during which the human body, and in particular the helmet, slips on this laminar support.

By means of the characteristics of the present invention, it is thus possible simultaneously to retain at the top and bottom the part of the human body which has impacted, for example the head, which may be wearing a helmet, thus preventing the latter from moving up or down, such that the laminar shock-absorption element can exert its shock-absorption action in an appropriate manner, and, in addition, since there is an invariable coefficient of friction within the range of temperatures of work of this laminar support in the event of impact, the impact trajectory is deflected, and the human body is guided transversely and slips at the same time as the kinetic energy is being absorbed, until total braking takes place, thus avoiding frontal impacts with supports or other elements, which, in the case of highways, have led to so many lesions, amputations, or even deaths.

Thus, the laminar support for absorption of impacts which is the subject of the present invention is characterized in that it has mechanical characteristics which are differentiated according to its transverse cross-section, basically providing greater strength in the upper and lower part compared with the central part, and it can also have differentiated characteristics of resistance in the longitudinal sections, with dimensions which will depend on whether the system or the supports are to be used for the application for which the device is intended.

The surface friction characteristics must be controlled and relatively high in order to absorb energy from the body in a situation of collision, but at all times avoiding allowing the surface of the support to become partially fluid, which could be transformed into adherence of the clothing or helmet of the person who is in a situation of collision, thus potentially detracting considerably from the performance of the laminar support, in particular from the point of view of producing violent rotational torque on the helmet, which, when translated to the head of the user, could give rise to serious injury or even death. Consequently, one of the most important features of the laminar support which is the subject of the present invention will consist precisely in the fact that the coefficient of surface friction of the laminar support has values which are controlled and vary little, including at the relatively high temperatures which may be created by the violent friction of a helmet or another item of clothing of the human body.

A structure which has proved to be especially advantageous for obtaining the objective of the invention consists of the constitution of a laminar body in which various areas are distinguished transversely, for example, and, without this acting as limitation for the present invention, an area of greater resistance with low deformation, which is situated at each of the edges of the laminar element, and then, on both sides towards the central part, intermediate areas of high deformation, which in turn delimit a central area with average deformation capacity. However, it must be understood that the number and specific characteristics of the strips or areas of the laminar support can be varied widely, without departing from the scope of the present invention.

Likewise, the material which is to form the laminar element can be varied widely, for example it could be a textile material of a woven type with shed, warp and weft, a type of knit, or the like, or a continuous synthetic support produced by means of a synthetic or natural elastomer, optionally reinforced by interlaced straight or transverse or diagonal resilient cords or the like. In a preferred embodiment, the laminar support will comprise apertures in selected areas with, for example, higher density, i.e. with a larger total perforated surface area, in the intermediate areas of high deformation, and with lesser density in the central area, all of which is designed to obtain a controlled coefficient of friction with a value which is variable according to the different areas of the laminar support. In particular, the function of the different areas is to obtain controlled deformation of the laminar support such that, in the event of impact, a concave area is produced in the central part of the laminar support, which guides the displacement of the impacting body, thus channeling the latter and simultaneously absorbing the greatest possible part of the kinetic energy as a result of the resilience of the laminar support assembly and of the friction produced by the body in collision with the laminar support as it slides along the latter. There is also the possibility of the lower transverse cross-section which is in contact with the ground having in its structure a more open mesh for the purpose of improving the discharge of rain water.

Although the practical embodiment of the laminar support for absorption of impacts which is the subject of the present invention can be widely variable, a description will be provided hereinafter of an embodiment which, nevertheless, will not in any way have a limiting nature.

In the preferred embodiment, the laminar support will have a base fabric, a covering for this fabric, and an outer surface coating, such that the base fabric serves the purpose of providing the characteristics of resistance and resilience required for each area, thus providing the controlled deformation of the laminar support. The covering of the fabric will be of the plastics type, and will comprise a material which is to cover the base fabric, leaving open spaces in the controlled areas, and the outer surface coating will be designed to provide the laminar impact absorption support with the characteristics of controlled sliding, and resistance to heat produced by friction, thus preventing partial adherence to the body during impact.

In a particular case, the base fabric can be made of high-strength polyester threads with yarn counts of 1000 to 6000 Denier, although in cases when greater impacts are foreseeable, it will be possible to use threads which are compounds of polyamides, aramids, etc., the stress strain curves of which are suitable for the requirements concerned.

Under no circumstances will the different transverse cross-sections of the laminar support be stitched or spliced together, but they will form part of a single fabric.

The average weight of this textile base will be able to be varied between broad limits, for example between 0.2 and 1.3 $kg/m^2$.

The covering will comprise a plastics matrix, which according to one embodiment is constituted by:
  a chlorinated polymer material, for example a poly(vinyl chloride);
  a double unit plasticizer;
  a fireproofing mineral filler material;
  thermal stabilisers;
  an ultraviolet ray absorbent; and
  fungicides.

There is also the possibility of the covering comprising products which are free from PVC, such as EVA (ethyl vinyl alcohol) or PMM (methacrylate polymers), again as a covering to surround the base fabric or mesh.

When the covering has gelled and has been polymerised, application of it will cover completely the threads of the base fabric, leaving the open spaces provided in the intermediate sections of the support, especially in the strips in the immediate vicinity of the areas of greater resistance of the upper and lower outer edges. The apertures will have dimensions which are variable, but in all cases smaller than sizes which could permit the insertion of a finger of the person in a situation of impact.

The outer coating must provide the laminar support with characteristics of controlled friction, thus permitting sliding of the body in a situation of impact, and with resistance to the heat generated by friction, thus avoiding partial adherence at the temperature values which can be reached in the aforementioned situations of collision. For this reason, the outer coating must have friction characteristics which are free from adherence in the case of temperatures of 100° C. or more.

An embodiment of a coating of this type is one which is obtained by means of a combination of acrylates, silicates, polytetrafluoroethylene and silicone.

Figure 2:
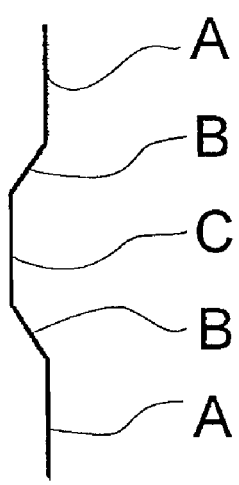

The detailed constitution of a laminar support according to the present invention can be seen in the attached drawing, in which:

FIG. 1 shows a front elevation view of a section of a laminar support for absorption of impacts according to the present invention; and FIG. 2 shows a schematic transverse cross-section of the laminar support itself adopting a typical form of deformation at the moment of impact.

As can be seen in FIG. 1, an example of a laminar support according to the present invention could comprise five or more strips in a transverse direction, such that the strips -A- are disposed at the upper and lower edges of the laminar support, and the areas -B- are disposed immediately after the said areas -A- towards the central part of the laminar support, thus delimiting the strip(s) of the central area -C-. According to the present invention, the areas -A- have characteristics of low deformation, i.e. higher resistance, and consequently a lower dimensional deformation capacity, whereas the layers -B- have characteristics of high deformation, and the strip -C- has characteristics of intermediate deformation. By means of the constitution, at the moment of impact, the outer areas -A- both at the upper part and at the lower part have lower deformation, which is shown in an exaggerated manner in the diagram in FIG. 2, as retaining the same flat structure as the initial laminar support. The areas -B- have a high capacity for deformation, which permits the formation of an extensive cavity determined by the intermediate area -C-, which, after the impact, will remain at a deeper depth than the outer areas -A-. By this means, the cavity which is determined in the intermediate area of the laminar support will prevent the body from emerging easily during impact from the upper or lower part of the laminar support, thus channeling the friction applied to the body along the said cavity, for the purpose of reducing as far as possible the kinetic energy of the body during impact. Simultaneously, and because of the characteristics of the surface covering, even though friction creates temperature higher than 100° C. in the part subjected to friction, no adherence will take place with the body undergoing the impact, which will prevent the generation of torque forces on the body undergoing the impact, as can happen in the case of the helmet of a driver, which could transmit high forces which would be impossible for the human body to withstand without sustaining serious or even fatal injuries.

The number of areas -A-, -B- and -C-, five of which altogether are shown in the example, can be varied widely, as can the individual width values of the areas. In one embodiment, the areas -A- and -C- can have an approximate width of 20 cm, and the areas -B- can have a width of about 5 cm, without this being absolutely limitative.

An explanation will be provided hereinafter of characteristics of an embodiment, with reference to its base fabric, covering and finishing, as well as of the mechanical characteristics of the different areas. This explanation will refer to the diagrams in FIGS. 1 and 2.

The laminar support as a whole must comply with the following Standards documentation:
UNE 135900-1
UNE 135900-2
UNE EN ISO 2286-2
UNE EN ISO 1421
DIN 53363
UNE 23723
DIN 53372
UNE EN ISO 2411

The base fabric must have adequate behaviour in accordance with UNE 135900-1 and UNE 135900-2. In one example, this will involve shed fabric in which the warp will comprise 3300 Dtex polyester thread and the weft will be 3300 Dtex polyester thread and 6600 Dtex polyester thread, with a weft arrangement in accordance with the following ratio: 6 threads of 3300 Dtex and 3 threads of 6600 Dtex. The density of the warp will be variable in accordance with the areas -A-, -B- or -C- represented in FIGS. 1 and 2, and of which the following is an example:
Area A: 13.8 threads/cm
Area B: 4.82 threads/cm
Area C: 5.36 threads/cm The density of the weft can be, for example, 3.5 threads/cm.

Weave: Amalgamation derived from plain weave in order to obtain structured deformation so as to avoid exceeding the impact forces described by UNE 135900-1 and 135900-2, as well as permeability to air and water.

Variable according to area -A-, -B- or -C- of the fabric, in accordance with the diagram in appendix 1
Area A: Low deformation weave
Area B: High deformation weave
Area C: Medium deformation weave.

The covering will have a composition based on polyvinyl chloride with treatment in order to obtain good resistance to inclemency and resistance to fire in accordance with Standard UNE 23723 classification M-2.

The covering must assure complete covering of the threads of the fabric with a smooth surface in area -A-, maximum apertures of 6×6 mm in area -B-, and a surface which is porous and permeable to water in area -C-.

The finish of the upper surface or surface for receipt of the impact will take place by means of treatment in order to facilitate the sliding necessary and simultaneous absorption of impact energy, and it must remain below the values described in Standard UNE 135900-1.

The mechanical and chemical properties of the laminar support described by way of example can be the following:
Width: 70 cm
Weight per linear meter UNE EN ISO 2286-2: Minimum 950 gr/l·m.
Area A
Resistance to traction UNE EN ISO 1421
Warp: Minimum 800 daN/5 cm
Weft: Minimum 350 daN/5 cm
Rupture elongation UNE EN ISO 1421:
Warp: Maximum 17%
Weft: Maximum 25%
Resistance to tearing DIN 53363:
Warp: Minimum 600 daN
Weft: Minimum 200 daN
Area B
Resistance to traction UNE EN ISO 1421
Warp: Minimum 400 daN/5 cm
Weft: Minimum 350 daN/5 cm
Rupture elongation UNE EN ISO 1421:
Warp: Minimum 17%
Weft: Minimum 25%
Resistance to tearing DIN 53363:
Warp: Minimum 200 daN
Area C
Resistance to traction UNE EN ISO 1421
Warp: Minimum 400 daN/5 cm
Weft: Minimum 350 daN/5 cm
Rupture elongation UNE EN ISO 1421:
Warp: Minimum 17%
Weft: Minimum 25%
Resistance to tearing DIN 53363:
Warp: Minimum 200 daN
Weft: Minimum 200 daN
Reaction to fire UNE 23723: Classification M-2
Resistance to temperatures DIN 53372: −20° C./+80° C.
Adherence UNE EN ISO 2411: Minimum 6 daN/3 cm It will be understood that, although the invention has been described on the basis of preferred examples, it will not be limited to these examples, and, since they are familiar with the subject which forms the basis of the present invention, experts in this field will be able to introduce many variants which will be included within its scope, as contained in the following claims.

The invention claimed is:
1. A laminar support that is deformation by impact of an object, the laminar support comprising:
(a) A base, comprising various areas running transversely from a top of the laminar support to a bottom of the laminar support, the various areas including:
an upper edge at the top of the laminar support,
a central area,
a lower edge at the bottom of the laminar support,
wherein the upper and lower edges have lower deformation capabilities as compared to the central area, in order to produce a concave shape in the central area upon impact of the object into the laminar support,
a first intermediary area, positioned between the upper edge and the center area, a second intermediary area, positioned between the central area and the lower edge, wherein the first intermediary area and second intermediary area have a higher deformation capability than the central area, wherein the base is a strip having length and a width, said width extending between the top and the bottom of the laminar support and said length being substantially greater than said width, wherein the first intermediary area and second intermediary area extend continuously along the length of the strip;

(b) a covering that covers the base; and (c) an outer surface coating on the covering, wherein the outer surface coating provides the laminar support with characteristics of controlled friction that permit sliding of the object against the laminar support without adherence to the laminar support at or above 100° C.

2. The laminar support of claim 1, wherein the laminar support consists essentially of a single synthetic material that forms a continuous strip.

3. The laminar support of claim 2, wherein the laminar support in the form of the strip of synthetic material comprises woven or non-woven thread-type reinforcement elements.

4. The laminar support of claim 1, wherein the base is a shed type, with warp and weft.

5. The laminar support of claim 1, wherein the base is made of a type of knit.

6. The laminar support of claim 1, wherein the laminar support further comprises apertures in controlled areas.

7. The laminar support of claim 1, wherein apertures occupy an upper surface of the first and second intermediary area.

8. The laminar support of claim 1, wherein the upper and lower edges are smooth and without apertures.

9. The laminar support of claim 1, wherein the base comprises high-strength polyester threads.

10. The laminar support of claim 1, wherein the base comprises polyamide threads.

11. The laminar support of claim 1, wherein the base comprises aramid threads.

12. The laminar support of claim 1, wherein the covering comprises a chlorinated polymer material, a plasticizer, a fireproofing mineral filler, thermal stabilisers, ultraviolet ray absorbents and fungicides.

13. The laminar support of claim 12, wherein the chlorinated polymer material is polyvinyl chloride.

14. The laminar support of claim 1, wherein the covering comprises a polymer.

15. The laminar support of claim 1, wherein the outer surface coating comprises acrylates, silicates, polytetrafluoroethylene and silicones.

16. The laminar support of claim 14, wherein the polymer is EVA (ethyl vinyl alcohol) or PMM (methacrylate polymers).

17. The laminar support of claim 7, wherein the covering completely covers the base except for the apertures that occupy the upper surface in the first and second intermediary areas.

* * * * *